United States Patent
Miyoshi

(10) Patent No.: US 10,148,855 B2
(45) Date of Patent: Dec. 4, 2018

(54) IMAGE FORMING APPARATUS AND CONTROL METHOD FOR THE SAME

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Nobuyuki Miyoshi, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 14/996,378

(22) Filed: Jan. 15, 2016

(65) Prior Publication Data

US 2017/0208213 A1   Jul. 20, 2017

(51) Int. Cl.
| | |
|---|---|
| H04N 1/44 | (2006.01) |
| H04N 1/00 | (2006.01) |
| G03G 15/00 | (2006.01) |
| G03G 21/04 | (2006.01) |

(52) U.S. Cl.
CPC ............ H04N 1/442 (2013.01); G03G 15/50 (2013.01); G03G 21/04 (2013.01); H04N 1/00251 (2013.01); H04N 1/4433 (2013.01); H04N 2201/0094 (2013.01)

(58) Field of Classification Search
None
See application file for complete search history.

(56) References Cited

U.S. PATENT DOCUMENTS

| | | | | |
|---|---|---|---|---|
| 8,289,546 B2 * | 10/2012 | Hayasaki | ........... | G06K 9/00221 358/1.15 |
| 8,724,856 B1 * | 5/2014 | King | .................. | G06K 9/00221 340/5.82 |
| 2007/0127785 A1 * | 6/2007 | Hiraizumi | .......... | G06K 9/00281 382/118 |
| 2009/0044714 A1 * | 2/2009 | Bae | .................... | G06K 9/00281 101/485 |

FOREIGN PATENT DOCUMENTS

JP     2012-175627     9/2012

* cited by examiner

*Primary Examiner* — King Poon
*Assistant Examiner* — Michael Burleson
(74) *Attorney, Agent, or Firm* — Amin, Turocy & Watson LLP

(57) ABSTRACT

In accordance with an embodiment, an image forming apparatus comprises a peripheral image acquisition section, a face detection section, a face recognition section and a printing control section. The peripheral image acquisition section acquires an image of the periphery of the image forming apparatus. The face detection section detects a face of person from the image acquired by the peripheral image acquisition section. The face recognition section calculates a matching rate indicating a matching degree of the face of person detected by the face detection section with a face of a user registered in advance. The printing control section executes a processing relating to printing of the image forming apparatus in a plurality of stages corresponding to the matching rates according to the matching rate calculated by the face recognition section and a threshold value of the matching rate.

10 Claims, 6 Drawing Sheets

IMAGE FORMING APPARATUS AND CONTROL METHOD FOR THE SAME

FIELD

Embodiments described herein relate generally to an image forming apparatus and a control method for the image forming apparatus.

BACKGROUND

Conventionally, a face recognition technology which detects a face of a person from an image is put into practical use. Such a face recognition technology is applied to an authentication module in an MFP (multi-functional peripheral) for a user. In the MFP to which such a face recognition technology is applied, the user does not need to input qualification information such as a password when using the MFP. Thus, the load of the user is reduced when using such an MFP.

On the other hand, the conventional MFP is transited to a state in which the MFP can print after authentication of the user is carried out. In a case of authenticating a user in response to an input operation of the user, it is possible for the MFP to transit to a state in which the MFP can print in parallel with the operation of the user. However, as stated above, in a case in which the MFP is provided with the authentication module with the use of the face recognition technology, the user does not need to carry out an input operation. Thus, there is a possibility that the user may feel that he/she needs to wait longer time in front of the MFP than the conventional MFP in a case in which the input operation is not required.

DETAILED DESCRIPTION

In accordance with an embodiment, an image forming apparatus comprises a peripheral image acquisition section, a face detection section, a face recognition section and a printing control section. The peripheral image acquisition section acquires an image of the periphery of the image forming apparatus. The face detection section detects a face of person from the image acquired by the peripheral image acquisition section. The face recognition section calculates a matching rate indicating a matching degree of the face of person detected by the face detection section with a face of a user registered in advance. The printing control section executes a processing relating to printing of the image forming apparatus in a plurality of stages corresponding to the matching rates according to the matching rate calculated by the face recognition section and a threshold value of the matching rate.

Hereinafter, an image forming apparatus and a control method for the image forming apparatus according to the embodiment are described with reference to the accompanying drawings.

Figure 1:
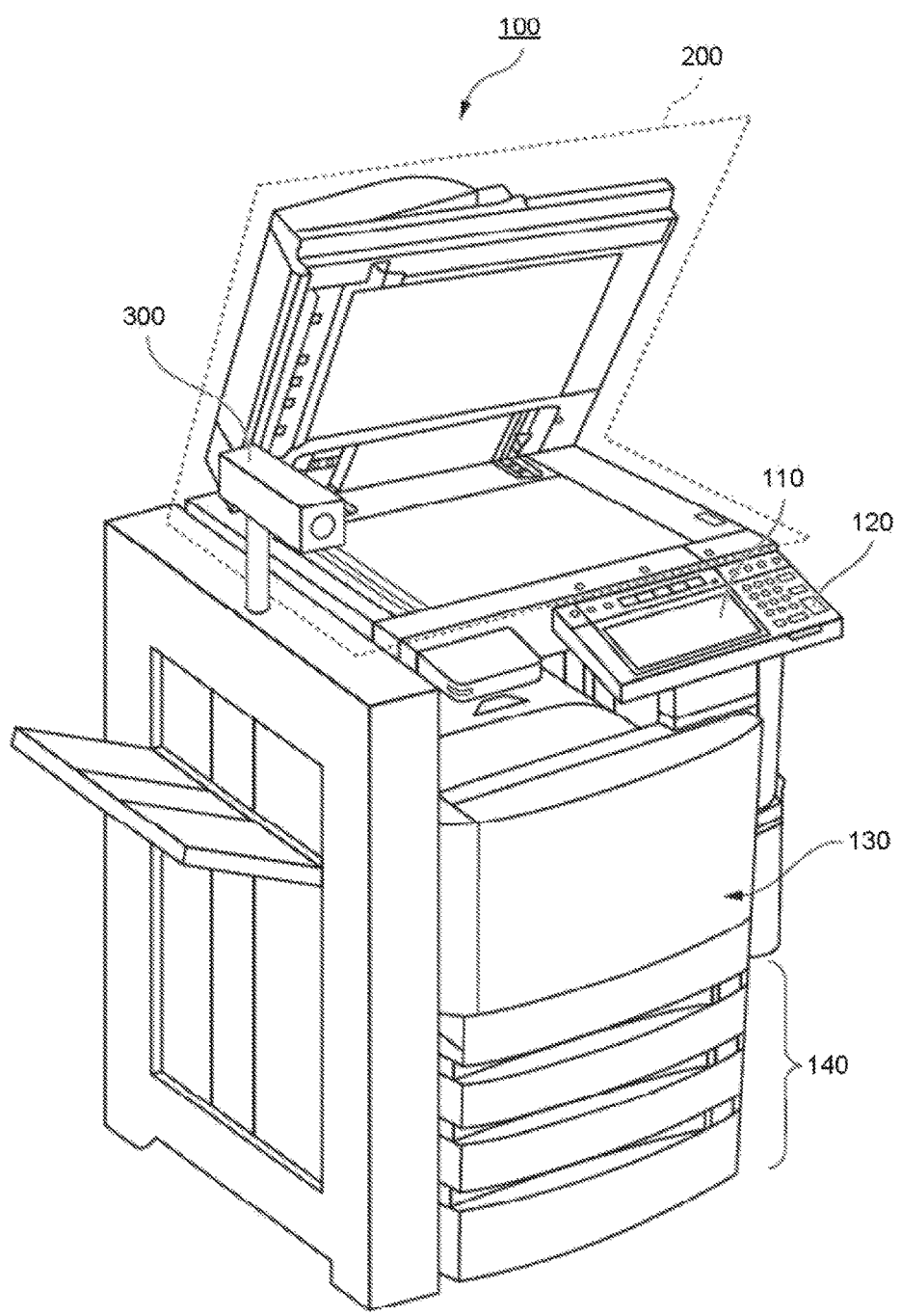
FIG. 1 is an external view illustrating an example of the whole constitution of an image forming apparatus 100 according to an embodiment.

FIG. 1 is an external view illustrating an example of the whole constitution of an image forming apparatus 100 according to an embodiment. The image forming apparatus 100 is, for example, a multi-functional peripheral. The image forming apparatus 100 comprises a display 110, a control panel 120, a printer section 130, a sheet housing section 140, an image reading section 200 and an image capturing section 300. Further, the printer section 130 of the image forming apparatus 100 may be a device which fixes a toner image, or an inkjet type device.

The image forming apparatus 100 forms an image on a sheet with a developing agent such as toner. For example, the sheet is a paper or a label paper. As long as the image forming apparatus 100 can form an image on the surface of sheet, no limitation is given to the form of the sheet.

The display 110 is an image display device such as a liquid crystal display, an organic EL (Electro Luminescence) display and the like. The display 110 displays various kinds of information relating to the image forming apparatus 100.

The control panel 120 is provided with a plurality of buttons. The control panel 120 receives operations by a user. The control panel 120 outputs signals corresponding to the operations carried out by the user to a control section of the image forming apparatus 100. Further, the display 110 and the control panel 120 may be constituted as an integrated touch panel.

The printer section 130 forms an image on the sheet according to the image information generated by the image reading section 200 or image information received through a communication path. For example, the printer section 130 forms an image through a following processing. An image forming section of the printer section 130 forms an electrostatic latent image on a photoconductive drum according to the image information. The image forming section of the printer section 130 enables the developing agent to adhere to the electrostatic latent image to form a visible image. As a concrete example of the developing agent, there is toner. A transfer section of the printer section 130 transfers the visible image onto the sheet. A fixing device of the printer section 130 heats and presses the sheet to fix the visible image on the sheet. Further, the sheet formed with the image may be a sheet housed in the sheet housing section 140, or a manually fed sheet.

The sheet housing section 140 stores the sheets used in image forming processing by the printer section 130.

The image reading section 200 reads image information of a reading object as brightness and darkness of light. The image reading section 200 records the read image information. The recorded image information may be sent to other information processing apparatus via a network. The recorded image information may be formed to be an image on a sheet with the printer section 130.

The image capturing section 300 is an image capturing device such as a camera which photographs the periphery of the image forming apparatus 100. For example, as shown in FIG. 1, the image capturing section 300 is arranged at the upper part of the image forming apparatus 100. The image capturing section 300 continuously photographs the periphery of the image forming apparatus 100 in a given cycle. The image capturing section 300 generates an image (hereinafter referred to as a "peripheral image") obtained by photographing the periphery of the image forming apparatus 100, and outputs it to the image forming apparatus 100. As long as it can photograph the periphery of the image forming apparatus 100, the image capturing section 300 is not limited to be installed on the image forming apparatus 100. For example, the image capturing section 300 may be connected with the image forming apparatus 100 through a communication cable, and arranged on a wall or ceiling in a room where the image forming apparatus 100 is arranged.

Figure 2:
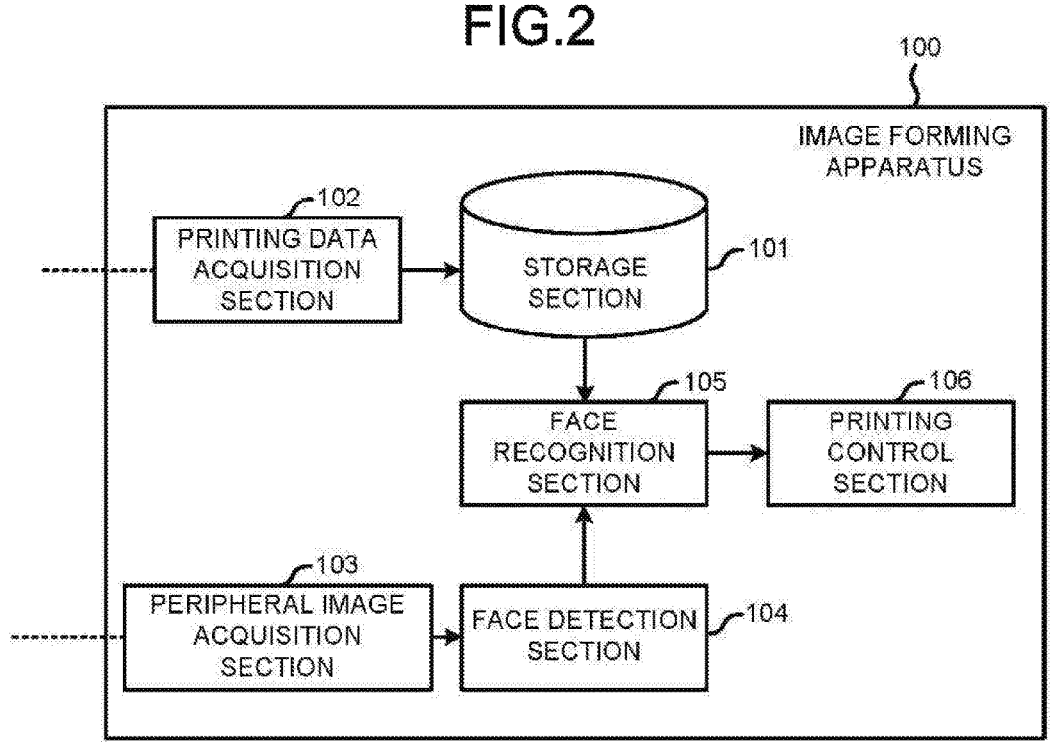
FIG. 2 is a functional block diagram illustrating the functional components of the image forming apparatus 100 according to the embodiment.

FIG. 2 is a functional block diagram illustrating the functional components of the image forming apparatus 100 according to the embodiment. The image forming apparatus 100, which comprises a CPU (Central Processing Unit), a memory and an auxiliary storage device that are connected with each other through a bus line, executes control programs. The image forming apparatus 100 functions as an apparatus comprising a storage section 101, a printing data acquisition section 102, a peripheral image acquisition section 103, a face detection section 104, a face recognition section 105 and a printing control section 106 through the execution of the control programs. Further, the whole or part of functions of the image forming apparatus 100 may be realized by the hardware such as an ASIC (Application Specific Integrated Circuit), a PLD (Programmable Logic Device), a FPGA (Field Programmable Gate Array) and the like. The control programs may be recorded in a computer-readable recording medium. The computer-readable recording medium is a storage device such as a flexible disc, an optical magnetic disc, a ROM, a movable medium such as a CD-ROM, a hard disc that is arranged inside a computer system and the like. The control programs may be sent via an electrical communication line.

The storage section 101 is a storage device such as a magnetic hard disc, a semiconductor storage device and the like. In the storage section 101, information (hereinafter referred to as "user information") relating to the user of the image forming apparatus is stored in advance. For example, the user information contains information indicating printing conditions set for each user, attribute of a user and the like. Further, the user information contains information (hereinafter referred to as "first face information") indicating facial features of each user. The first face information can be generated through any existing method as long as it can indicate facial features and can be compared through numerical values. For example, the first face information is indicated by positions of a plurality of feature points extracted from the image obtained by photographing the face of user.

Further, the storage section 101 stores data (hereinafter referred to as "printing data") to be printed. For example, the printing data is generated in a user terminal such as a PC (personal computer) when the user inputs a printing instruction. The generated printing data is sent to the image forming apparatus 100. Further, the printing data is sent to the image forming apparatus 100 together with the identification information of the user who inputs the printing instruction. In this way, the image forming apparatus 100 is possible to recognize the user who gives an instruction to print the printing data according to the identification information of the user sent together with the printing data.

The printing data acquisition section 102 includes a communication interface that is capable of communicating with the user terminal. The printing data acquisition section 102 communicates with the user terminal to acquire the printing data from the user terminal. The printing data acquisition section 102 stores the acquired printing data in association with the identification information of the user sent together with the printing data in the storage section 101.

The peripheral image acquisition section 103 acquires a peripheral image from the image capturing section 300. The peripheral image acquisition section 103 outputs the acquired peripheral image to the face detection section 104.

The face detection section 104 acquires the peripheral image from the peripheral image acquisition section 103. The face detection section 104 detects a face of person from the acquired peripheral image. An existing face recognition technology may be used to detect the face of person from the peripheral image through the face detection section 104. Based on the image containing the detected face of person, the face detection section 104 generates information (hereinafter referred to as "second face information") indicating the features of the detected face of person. The face detection section 104 outputs the generated second face information to the face recognition section 105.

The face recognition section 105 acquires an index value indicating a matching degree of the face of person detected from the peripheral image with a face of the user registered in the image forming apparatus in advance. Hereinafter, this index value is referred to as a matching rate. Specifically, the face recognition section 105 calculates a matching rate according to the first face information registered in the image forming apparatus in advance and the second face information generated from the peripheral image. For example, the face recognition section 105 calculates the matching rate according to the magnitude of deviation of the position of feature points indicated in the first face information from the position of feature points indicated in the second face information.

The printing control section 106 controls to start the processing relating to printing of the image forming apparatus in a plurality of stages corresponding to the matching rate calculated by the face recognition section 105. Hereinafter, the processing relating to printing of the image forming apparatus 100 is described as a printing-related processing. For example, a heating processing of the fixing device is one of the printing-related processing. The heating processing of the fixing device is used to heat the fixing device from a state in which the temperature thereof is lower than a temperature at which the visible image is fixed on a sheet to a fixable temperature. Specifically, the temperature of the fixing device rises from a state in which the temperature thereof is lower than a temperature at which the visible image is fixed on a sheet to a state of a fixable temperature by supplying power to the heater of the fixing device or by increasing the supplied power.

Further, for example, an acquisition processing of printing data is one of the printing-related processing. The acquisition processing of printing data refers to acquiring given printing data of a user from the printing data stored in the storage section 101. Further, in a case in which the printing data is stored by an external device such as a print server, the printing data may be acquired through communication with the external device.

Further, for example, an image processing executed for the printing data is one of the printing-related processing. For example, the image processing is a processing for improving image quality, a processing for synthesizing a plurality of images and the like.

Further, for example, an authentication processing is one of the printing-related processing. The authentication processing is used to authenticate a user who operates the image forming apparatus 100. After the user is authenticated by the image forming apparatus 100, it is possible to print the printing data sent from the user terminal.

Further, for example, an image forming processing is one of the printing-related processing. The image forming processing is used to form the visible image generated according to the printing data on a sheet with toner.

The printing control section 106 controls the execution of the printing-related processing in a plurality of stages corresponding to matching rates acquired according to the peripheral image. Further, the printing-related processing described above is an concrete example, and the printing-related processing controlled by the printing control section 106 may be processing other than the aforementioned processing.

Incidentally, in general, the closer the position of an image capturing object is to the image capturing apparatus in a real space, the higher the precision for recognizing the image capturing object in an image is. Thus, the matching rate of the person detected from the peripheral image becomes higher values as the user is photographed at positions closer to the image forming apparatus 100. In other words, the matching rate is considered to be correlative to a distance between the person detected from the peripheral image and the image capturing section 300. Thus, the user who is detected with a high matching rate is located at a position close to the image forming apparatus 100, and it is considered that the user uses the image forming apparatus 100 very probably. On the other hand, since the user who is detected with a low matching rate is located at a position far away from the image forming apparatus 100, it takes some time for the user to arrive at the image forming apparatus 100 in some degree. Thus, the printing-related processing is executed in a plurality of stages corresponding to the matching rates, and in this way, the image forming apparatus 100 can reduce the waiting time of the user.

Figure 3:
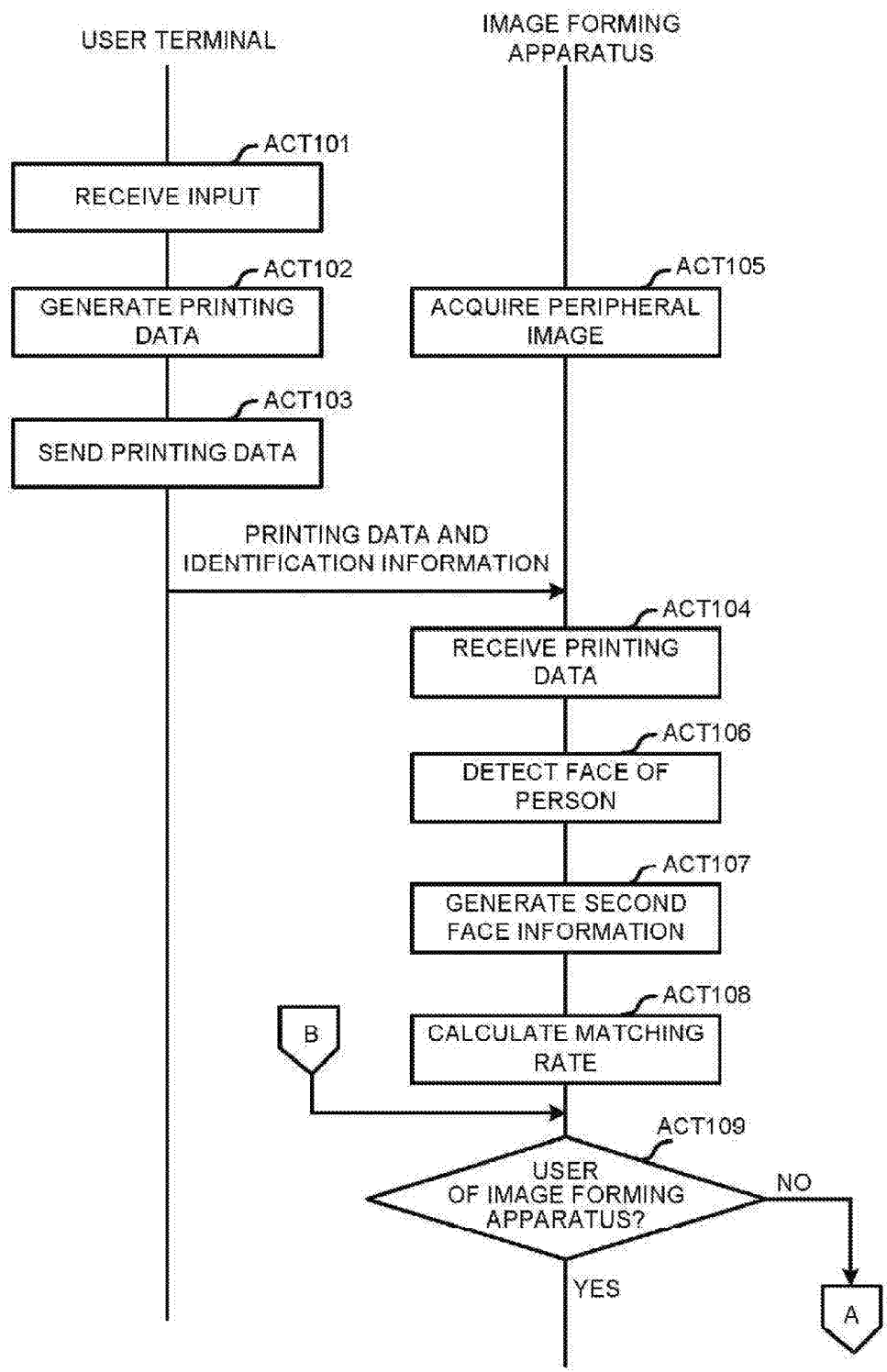
FIG. 3 is a sequence diagram illustrating the flow of a processing when the image forming apparatus 100 controls the execution of a printing-related processing in three stages (a first stage, a second stage and a third stage)
Figure 4:
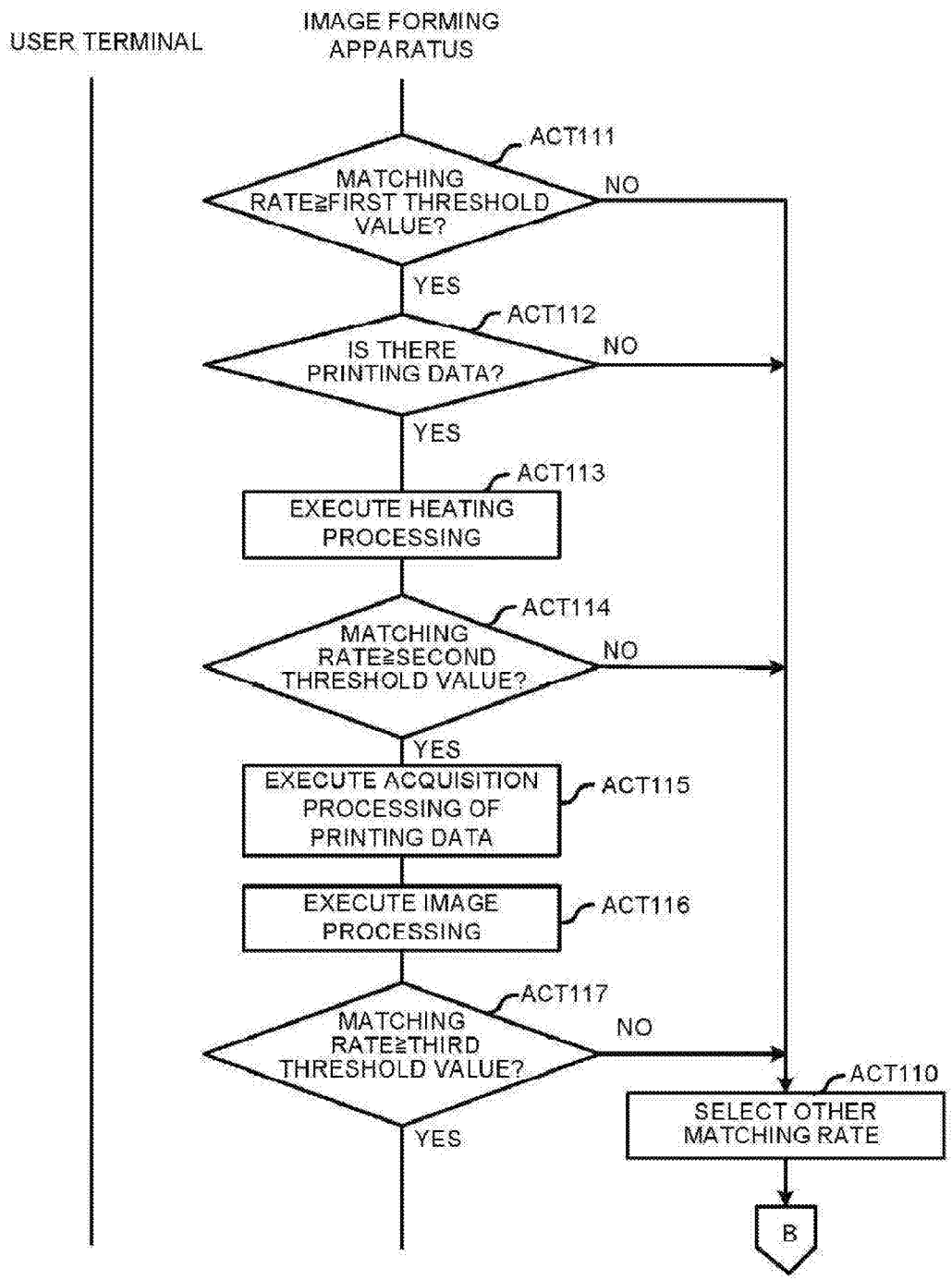
FIG. 4 is a sequence diagram illustrating the flow of the processing when the image forming apparatus 100 controls the execution of a printing-related processing in three stages (the first stage, the second stage and the third stage)
Figure 5:
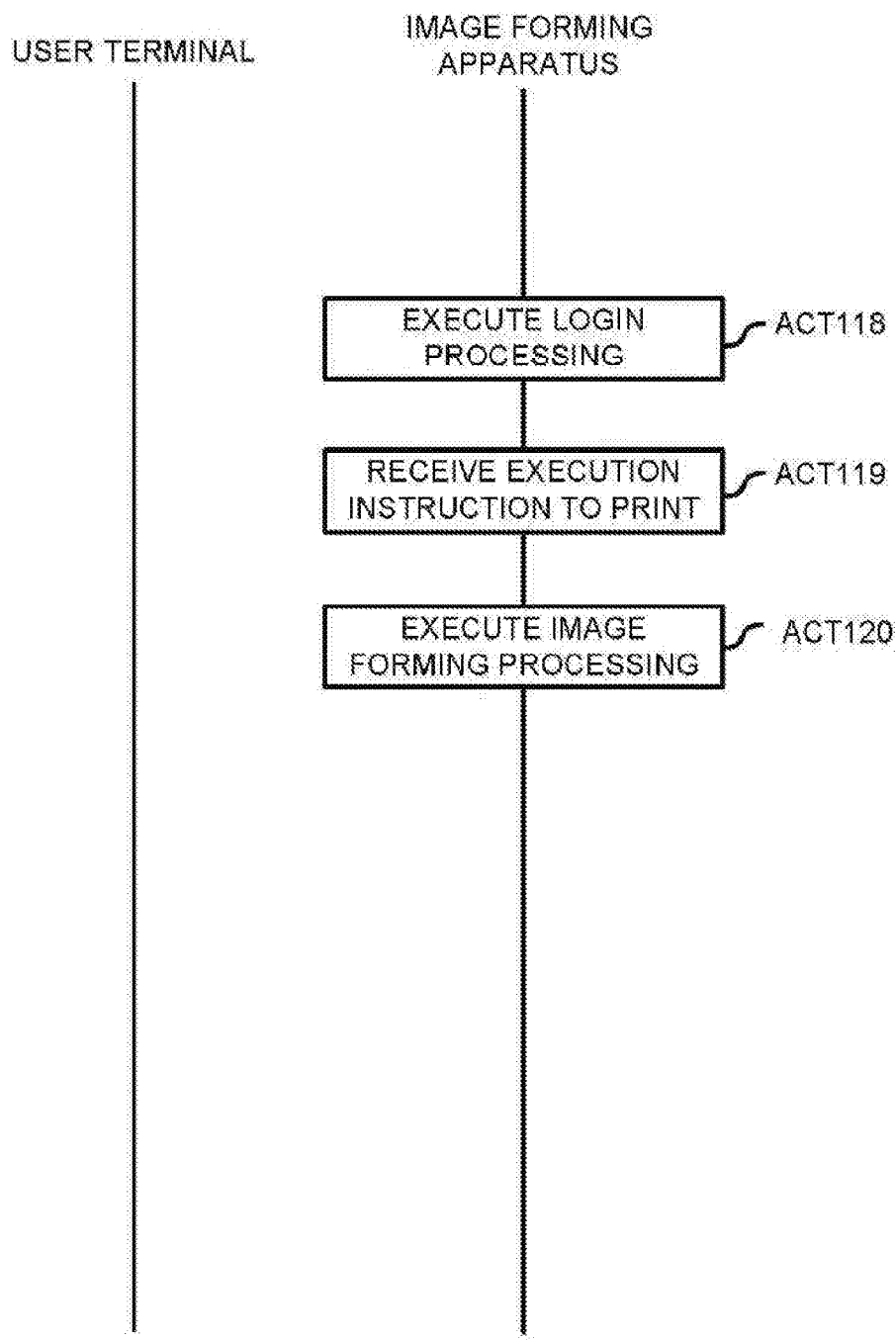
FIG. 5 is a sequence diagram illustrating the flow of the processing when the image forming apparatus 100 controls the execution of a printing-related processing in three stages (the first stage, the second stage and the third stage)

FIG. 3, FIG. 4 and FIG. 5 are sequence diagrams illustrating the flow of a processing when the image forming apparatus 100 controls the execution of the printing-related processing in three stages (including a first stage, a second stage and a third stage). Herein, it is exemplified that the heating processing of the fixing device, the acquisition processing of the printing data, the image processing, the authentication processing and the image forming processing are the printing-related processing to be controlled.

First, an operation to input a printing instruction is carried out in the user terminal. The user terminal receives an input of printing instruction (ACT 101). The user terminal generates printing data based on the input information (ACT 102). The user terminal sends the generated printing data and the identification information of the user who inputs the printing instruction to the image forming apparatus 100 (ACT 103).

The printing data acquisition section 102 of the image forming apparatus 100 receives the printing data and the identification information of the user sent from the user terminal (ACT 104). The printing data acquisition section 102 stores the received printing data in association with the identification information of the user in the storage section 101.

On the other hand, the image capturing section 300 of the image forming apparatus 100 photographs the periphery of the image forming apparatus 100. The image capturing section 300 outputs the peripheral image obtained by the image capturing process to the image forming apparatus 100. The peripheral image acquisition section 103 acquires the peripheral image from the image capturing section 300 (ACT 105). The peripheral image acquisition section 103 outputs the acquired peripheral image to the face detection section 104.

Further, the processing in ACT 101~ACT 104 can be executed at any time upon the input of the printing instruction in the user terminal. For facilitating the description, the processing in ACT 101~ACT 104 is only shown in the beginning of the flowchart in FIG. 3.

Further, the processing in and after ACT 106 is executed on the peripheral images respectively acquired in each image capturing cycle of the image capturing section 300. For facilitating the description, only the flow of a processing executed on one image captured in some image capturing cycle (For example, ACT 105) is shown in FIG. 3.

Next, the face detection section 104 acquires a peripheral image from the peripheral image acquisition section 103. The face detection section 104 detects a face of person from the acquired peripheral image (ACT 106). The face detection section 104 generates the second face information based on the image of the face of person detected from the peripheral image (ACT 107). The face detection section 104 outputs the generated second face information to the face recognition section 105.

The face recognition section 105 calculates a matching rate of the face of person detected from the peripheral image and a face of a user registered in the image forming apparatus in advance (ACT 108). Specifically, the face recognition section 105 calculates the matching rate according to the first face information that is registered in the image forming apparatus in advance and the second face information generated by the face detection section 104. The face recognition section 105 determines whether or not there is a user of the image forming apparatus among the detected persons according to the calculated matching rate (ACT 109). Specifically, the face recognition section 105 determines whether or not there is a user of the image forming apparatus among the detected persons by comparing a matching rate of each person with a given threshold value stored in the storage section 101. In a case in which the matching rate is smaller than the threshold value, the face recognition section 105 determines that the person is not the user of the image forming apparatus. Further, in a case in which the matching rate is greater than the matching rate, the face recognition section 105 determines that the person is the user of the image forming apparatus.

Further, the determination processing described herein is not used to specify the users strictly, but to reduce the number of users serving as the processing target. Since the user is specified through the subsequent determination processing described later, a relatively low matching rate may be set for the aforementioned threshold value. The aforementioned threshold value may be stored in the storage section 101 in advance, or input from an external terminal capable of communicating with the image forming apparatus 100 or the control panel 120. Further, the threshold value may be changed properly in response to the input from the control panel 120 or the terminal based on a test result at the time of design, an application result in practice and the like.

In a case in which there is no user of the image forming apparatus among the detected persons (NO in ACT 109), the face recognition section 105 returns to carry out the processing in ACT 105. On the contrary, in a case in which there is a user of the image forming apparatus among the detected persons (YES in ACT 109), the face recognition section 105 outputs the matching rate of this person to the printing control section 106. At this time, the face recognition section 105 outputs the matching rate of this person and the identification information of a user who may match with this person.

Figure 6:
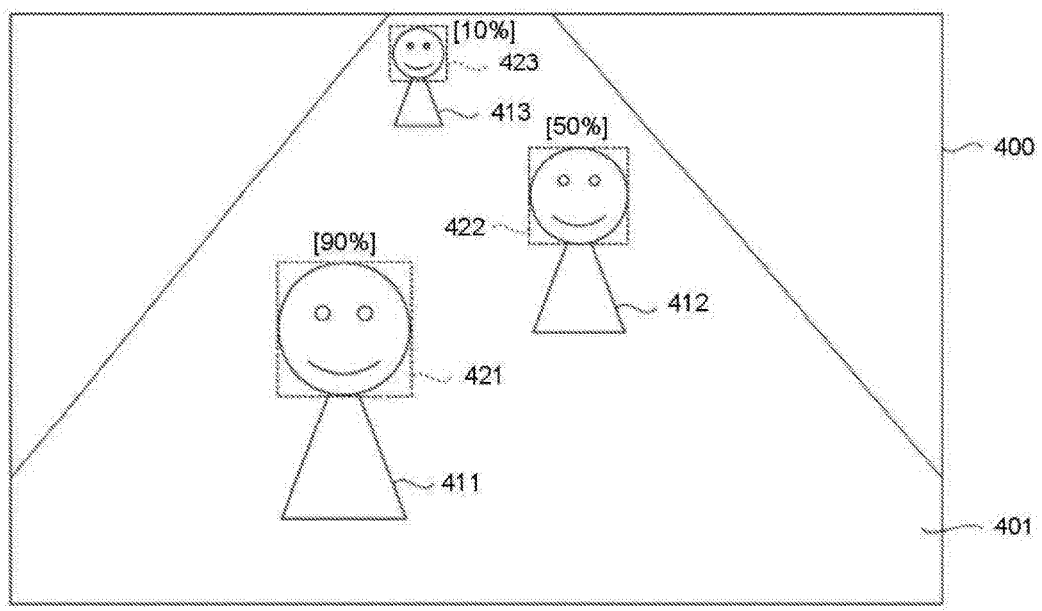
FIG. 6 is a diagram illustrating a concrete example of peripheral images where faces of persons are detected.

FIG. 6 is a diagram illustrating a concrete example of the peripheral image in which the faces of persons are detected. A peripheral image 400 is an example of peripheral images acquired by the image capturing section 300 which is arranged to photograph a passage 401 directed to the image forming apparatus 100. In the peripheral image 400, three persons including a person 411, a person 412 and a person 413 are photographed. The persons 411, 412 and 413 are located at positions close to the image capturing section 300 in the order of the person 411, the person 412 and the person 413.

Further, detection displays 421, 422 and 423 indicate the positions of faces of persons detected by the face detection section 104. The percentages recorded nearby all the detection displays indicate the matching rates calculated for the persons respectively. As shown in FIG. 6, in general, the more the person moves away from the image capturing section 300, the lower the matching rate is. Thus, it is possible to determine a distance between the image forming apparatus 100 and a person located at the periphery of the image forming apparatus 100 through the matching rate. Further, for the sake of simplicity, one matching rate is recorded for each person in FIG. 6; however, there is a case in which a plurality of matching rates may be calculated for each person. For example, in a case in which a plurality of users is registered in the image forming apparatus 100, the matching rate of each detected person with each of the users of the image forming apparatus 100 is calculated.

Return to the descriptions in FIG. 3, FIG. 4 and FIG. 5. The printing control section 106 acquires the matching rates of the persons detected from the peripheral image from the face recognition section 105. The printing control section 106 executes the printing-related processing respectively corresponding to the first~third stages according to the matching rates of the detected persons. Further, the matching rate of each person acquired herein is acquired in association with the number of users registered in the image forming apparatus 100 with respect to one person.

Specifically, the printing control section 106 selects any one matching rate from the acquired matching rates, and determines whether or not the selected matching rate is equal to or greater than the first threshold value (ACT 111). In a case in which the selected matching rate is smaller than the first threshold value (NO in ACT 111), the printing control section 106 selects one of the other acquired matching rates (ACT 110), and returns to carry out the processing in ACT 109.

On the contrary, in a case in which the selected matching rate is equal to or greater than the first threshold value (YES in ACT 111), the printing control section 106 determines whether or not there is printing data of a user corresponding to the matching rate in the storage section 101 (ACT 112). In a case in which there is no printing data of a user corresponding to the matching rate (NO in ACT 112), the printing control section 106 selects one of the other acquired matching rates (ACT 110), and returns to carry out the processing in ACT 109. On the contrary, in a case in which there is printing data of a user corresponding to the matching rate in the storage section 101 (YES in ACT 112), the printing control section 106 executes a first printing-related processing. The first threshold value is a matching rate higher than the threshold value used in the determination processing in ACT 109, and is a matching rate not higher to a degree under which a user can be specified. Thus, the printing control section 106 executes a printing-related processing which does not need to specify users as the first printing-related processing. For example, the printing control section 106 executes the heating processing of the fixing device (ACT 113).

Next, the printing control section 106 determines whether or not the selected matching rate is equal to or greater than the second threshold value (ACT 114). In a case in which the selected matching rate is smaller than the second threshold value (NO in ACT 114), the printing control section 106 selects one of the other acquired matching rates (ACT 110), and returns to carry out the processing in ACT 109. On the contrary, in a case in which the selected matching rate is equal to or greater than the second threshold value (YES in ACT 114), the printing control section 106 executes a second printing-related processing. The second threshold value is a matching rate higher than the first threshold value, and is a matching rate to a degree under which candidates may be narrowed down to a certain small number of users. Thus, the printing control section 106 executes a printing-related processing which is preferred to be executed after the candidates are narrowed down to a certain small number of users as the second printing-related processing. For example, the printing control section 106 executes the acquisition processing of the printing data of the user corresponding to the acquired matching rate (ACT 115). The printing control section 106 executes an image processing on the acquired printing data (ACT 116).

Next, the printing control section 106 determines whether or not the selected matching rate is equal to or greater than the third threshold value (ACT 117). In a case in which the selected matching rate is smaller than the third threshold value (NO in ACT 117), the printing control section 106 selects one of the other acquired matching rates (ACT 110), and returns to carry out the processing in ACT 109. On the contrary, in a case in which the selected matching rate is equal to or greater than the third threshold value (YES in ACT 117), the printing control section 106 executes a third printing-related processing. The third threshold value is a matching rate higher than the second threshold value, and is a matching rate higher to a degree under which a user can be specified. Thus, the printing control section 106 executes a printing-related processing on the premise that the user is specified as a third printing-related processing. For example, the printing control section 106 executes a user login processing (ACT 118). After the login processing is executed, the image forming apparatus 100 can be operated by the user corresponding to the selected matching rate. Further, the matching rate, which is higher than the third threshold value, means that the user is located at a position quite close to the image forming apparatus 100. Thus, by carrying out the login processing as the third printing-related processing, the user can operate the image forming apparatus 100 without inputting qualification information.

Next, the printing control section 106 carries out a notification (display, sound and so on) which urges the user to execute printing and receives an input of an execution instruction to print (ACT 119). If the execution instruction to print is input, the printing control section 106 executes an image forming processing on the printing data of the user (ACT 120).

The image forming apparatus 100 with the above-mentioned construction in the present embodiment can start an executable printing-related processing in advance until a user arrives at the position of the image forming apparatus. With such a function, it is possible for the user who operates the image forming apparatus 100 to reduce the waiting time when executing a printing processing.

In the present embodiment, the user information is stored in the storage section 101 of the image forming apparatus 100 in advance; however, the user information may be stored in a storage section of an external device in advance and read out from the storage section of the external device via a network.

Hereinafter, a modification of the image forming apparatus 100 of the embodiment is described.

The execution control on the printing-related processing carried out by the image forming apparatus 100 is not limited to the three-stages control described above. For example, the printing control section 106 may control to execute the printing-related processing in two stages or more than three stages. For example, the printing control section 106 may control to execute the heating processing of the fixing device in the first stage, and the other printing-related processing in the second stage. Further, the printing control section 106 may control to execute the acquisition processing of printing data in the second stage, the image processing in the third stage and the login processing in the fourth stage.

The execution order of the printing-related processing controlled by the image forming apparatus 100 may be changed or not provided in response to the state of the image forming apparatus 100. For example, in a case in which the fixing device has already been at a quite high temperature, the printing-related processing in the first stage may be not provided. Further, in a case in which there are much printing data to be processed, it may be controlled to execute the start of the image processing earlier than the start of the heating processing, for example.

As long as it is a determination method according to a distance from the image forming apparatus 100 to a user, the determination method in each stage is not limited to a form based on a matching rate. For example, the size of faces detected from the peripheral image is considered to be correlative to the distances between the detected person and the image capturing section 300. However, there is a possibility that a user cannot be specified only through the size of faces. Thus, in a stage in which it is not required to specify the user, the image forming apparatus 100 may carry out the determination processing in each stage with the size of the detected faces. Further, there is a conventional technology in which a distance between an image capturing object and an image capturing section is estimated according to an image. For example, the image forming apparatus 100 may carry out the determination processing in each stage on the basis of an estimated distance between the image capturing section 300 and the image capturing object according to an image.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a face recognition section configured to calculate a matching rate based on an information indicating image feature of a face of a person, detected from an periphery image that is an image of the periphery of image forming apparatus and an information indicating image feature of a registered image which is an image of a face of a user registered to the image forming apparatus in advance, wherein the matching rate correlates a distance between the image forming apparatus and the person whose face is detected from the periphery image; and
a printing control section configured to control a printing process having a plurality of processing stages, each processing stage being associated at least in part with a respective threshold in one or more thresholds, the printing control section configured to compare the matching rate to at least one of the one or more thresholds, and wherein the printing control section performs a first printing related process that does not need to specify a detected person as a specific user in response to the matching rate exceeding a first threshold relating to accuracy of detection, and wherein the printing control section performs a second printing related process associated with a group of users in response to the matching exceeding a second threshold relating to the accuracy of detection, and wherein the printing control section performs a third printing related process associated with a specified user in response to the matching rate exceeding a third threshold relating to the accuracy of detection, the third threshold being higher than a second threshold which is higher than the first threshold.

2. The image forming apparatus according to claim 1, wherein
each of the plurality of processing stages is associated with a respective processing set which comprises at least one of a heating processing of a fixing device, an acquisition processing of printing data, an image processing on the printing data and an image forming processing in which the printing data to which the image processing is carried out is formed on a sheet.

3. The image forming apparatus according to claim 1, wherein
the plurality of processing stages comprises a first processing stage and a second processing stage, the first processing stage is to be used before the user is specified, and the second processing stage is to be used after the user is specified.

4. The image forming apparatus according to claim 3, wherein
the first processing stage is to be used for performing the heating processing of the fixing device.

5. The image forming apparatus according to claim 3, wherein
the second processing stage is to be used for performing the acquisition processing of the printing data, the image processing on the printing data and the image forming processing on the printing data.

6. The image forming apparatus according to claim 3, wherein
the second processing stage includes a third processing stage and a fourth processing stage, the third processing stage is a stage on which the user is specified at a lower specified rate, and the fourth processing stage is another stage on which the user is specified at a higher specified rate which is higher than the lower specified rate, and the third processing stage is to be used for performing one or more processing which does not require user authentication and the forth processing stage is to be used for performing one or more processing which requires user authentication.

7. The image forming apparatus according to claim 6, wherein
the third processing stage is to be used for performing the image processing on the printing data, and the forth processing stage is to be used for performing a login processing.

8. The image forming apparatus according to claim 2, wherein
the printing control section configured to specify the user whose face is detected from the periphery image to the user who is registered to image forming apparatus in advance based on the matching rate, and the printing control section configured to authenticate a user who is specified at a higher specified rate without requiring a qualification information of the user.

9. The image forming apparatus according to claim 1, wherein
each processing stage is associated with the respective threshold in the one or more thresholds and a current state of the image forming apparatus.

10. A control method for the image forming apparatus, including:
calculating a matching rate based on an information indicating a image feature of a face of a person, detected from an periphery image that is an image of the periphery of image forming apparatus and an information indicating image feature of a registered image which is an image of a face of a user registered to the image forming apparatus in advance, wherein the matching rate correlates a distance between the image forming apparatus and the person whose face is detected from the periphery image; and
controlling a printing process having a plurality of processing stages, each processing stage being associated at least in part with a respective threshold in one or more thresholds, the printing control section configured to compare the matching rate to at least one of the one or more thresholds, and wherein the controlling performs a first printing related process that does not need to specify a detected person as a specific user in response to the matching rate exceeding a first threshold relating to accuracy of detection, and wherein the controlling performs a second printing related process associated with a group of users in response to the matching exceeding a second threshold relating to the accuracy of detection, and wherein the controlling performs a third printing related process associated with a specified user in response to the matching rate exceeding a third threshold relating to the accuracy of detection, the third threshold being higher than a second threshold which is higher than the first threshold.

* * * * *